United States Patent
Wang et al.

(10) Patent No.: US 11,197,040 B2
(45) Date of Patent: Dec. 7, 2021

(54) DERIVING AND SIGNALING A REGION OR VIEWPORT IN STREAMING MEDIA

(71) Applicant: MediaTek Inc., Hsinchu (TW)

(72) Inventors: Xin Wang, Rancho Palos Verdes, CA (US); Wang Lin Lai, San Jose, CA (US); Lulin Chen, Elk Grove, CA (US); Shan Liu, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 59 days.

(21) Appl. No.: 15/730,851

(22) Filed: Oct. 12, 2017

(65) Prior Publication Data

US 2018/0109817 A1   Apr. 19, 2018

Related U.S. Application Data

(60) Provisional application No. 62/408,867, filed on Oct. 17, 2016, provisional application No. 62/410,414, filed on Oct. 20, 2016.

(51) Int. Cl.
*H04N 21/4728* (2011.01)
*H04N 21/235* (2011.01)
(Continued)

(52) U.S. Cl.
CPC ....... *H04N 21/2353* (2013.01); *G06T 19/006* (2013.01); *H04N 13/388* (2018.05);
(Continued)

(58) Field of Classification Search
CPC ......... H04N 21/4728; H04N 21/85406; H04N 21/23439; H04N 19/167;
(Continued)

(56) References Cited

U.S. PATENT DOCUMENTS

| 5,442,456 A | * | 8/1995 | Hansen | G09B 5/065 386/230 |
| 9,269,245 B2 | * | 2/2016 | Park | G08B 13/19671 |

(Continued)

FOREIGN PATENT DOCUMENTS

CN     101427579 B    4/2012
WO  WO-2015197815 A1  * 12/2015  ....... H04N 21/85406

OTHER PUBLICATIONS

Singer, D. et al.; Technologies under Consideration for ISOBMFF; Coding of Moving Pictures and Audio; ISO/IEC JTC1/SC29/WG11 MPEG2017/N16935; Torino, Italy; Jul. 2017.
(Continued)

*Primary Examiner* — Daniel Chang
(74) *Attorney, Agent, or Firm* — Wolf, Greenfield & Sacks, P.C.

(57) ABSTRACT

A method or system for supporting dynamic construction of a user selected sub-region (e.g., viewport or region of interest) from other sub-regions of a reference media presentation encodes reference media presentation as component tracks. A streaming decoder receives a streaming media file of the reference media presentation and displays an arbitrarily selected sub-region of the reference media presentation. The streaming media file has a derived track that (i) references one or more of the plurality of component tracks and (ii) specifies a set of operations for constructing media samples based on the media samples of the referenced component tracks. The streaming decoder provides media samples for the selected sub-region by retrieving the referenced component tracks and performing the set of operations specified by the derived track.

21 Claims, 15 Drawing Sheets

(51) Int. Cl.
   *H04N 19/40*      (2014.01)
   *G06T 19/00*      (2011.01)
   *H04N 19/184*     (2014.01)
   *H04N 13/388*     (2018.01)
   *H04N 21/845*     (2011.01)
   *H04N 21/854*     (2011.01)
   *H04N 21/2343*    (2011.01)
   *H04N 21/2365*    (2011.01)

(52) U.S. Cl.
   CPC ........... *H04N 19/184* (2014.11); *H04N 19/40* (2014.11); *H04N 21/2365* (2013.01); *H04N 21/234318* (2013.01); *H04N 21/8456* (2013.01); *H04N 21/854* (2013.01); *H04N 21/85406* (2013.01)

(58) Field of Classification Search
   CPC ......... H04N 21/234327; H04N 21/816; H04N 13/161; H04N 19/162; H04N 19/172; H04N 19/176
   USPC ......... 348/222.1, 231.3; 375/240.01, 240.26; 725/116
   See application file for complete search history.

(56) References Cited

U.S. PATENT DOCUMENTS

| | | | |
|---|---|---|---|
| 9,900,631 B2* | 2/2018 | Shaw | H04N 21/44029 |
| 2004/0231001 A1* | 11/2004 | Kisliakov | H04N 7/17318 725/134 |
| 2006/0279628 A1* | 12/2006 | Fleming | H04N 21/4223 348/143 |
| 2007/0022215 A1* | 1/2007 | Singer | H04N 19/70 709/246 |
| 2007/0168866 A1* | 7/2007 | Khare | H04N 21/44222 715/723 |
| 2008/0013621 A1* | 1/2008 | Wang | H04N 19/33 375/240.01 |
| 2009/0119594 A1* | 5/2009 | Hannuksela | H04N 21/41407 715/723 |
| 2010/0153395 A1 | 6/2010 | Hannuksela et al. | |
| 2010/0183033 A1* | 7/2010 | Hannuksela | H04L 65/605 370/476 |
| 2011/0064146 A1* | 3/2011 | Chen | H04N 19/61 375/240.26 |
| 2012/0023250 A1* | 1/2012 | Chen | H04N 21/23608 709/231 |
| 2012/0038766 A1* | 2/2012 | Park | G08B 13/19652 348/143 |
| 2014/0282768 A1* | 9/2014 | Michael | H04N 21/23106 725/93 |
| 2015/0015789 A1* | 1/2015 | Guntur | H04N 21/2365 348/581 |
| 2015/0110203 A1* | 4/2015 | Wang | H04N 19/573 375/240.26 |
| 2015/0110473 A1* | 4/2015 | Wang | H04N 5/91 386/341 |
| 2015/0223767 A1* | 8/2015 | Sehnert | A61B 6/4411 378/42 |
| 2015/0237166 A1* | 8/2015 | Denoual | H04N 21/234327 709/217 |
| 2015/0365687 A1* | 12/2015 | Le Floch | H04N 21/234345 375/240.24 |
| 2016/0014480 A1* | 1/2016 | Maze | H04N 21/8451 725/116 |
| 2016/0021406 A1* | 1/2016 | Shaw | H04N 21/23439 348/445 |
| 2016/0029091 A1* | 1/2016 | Le Floch | H04N 21/234345 375/240.26 |
| 2016/0105690 A1* | 4/2016 | Denoual | H04N 19/46 375/240.02 |
| 2016/0165309 A1* | 6/2016 | Van Brandenburg | H04N 21/64322 725/116 |
| 2016/0165321 A1* | 6/2016 | Denoual | H04N 21/4728 725/116 |
| 2016/0182593 A1* | 6/2016 | Denoual | H04N 21/23439 709/219 |
| 2016/0182927 A1* | 6/2016 | Denoual | H04N 21/8455 725/109 |
| 2017/0111649 A1* | 4/2017 | Wang | H04N 19/30 |
| 2017/0111650 A1* | 4/2017 | Hendry | H04N 19/463 |
| 2017/0118540 A1* | 4/2017 | Thomas | H04N 19/167 |
| 2017/0223083 A1* | 8/2017 | Maze | H04L 65/608 |
| 2017/0223368 A1* | 8/2017 | Abbas | H04N 19/146 |
| 2017/0302719 A1* | 10/2017 | Chen | H04L 65/4069 |
| 2017/0339415 A1* | 11/2017 | Wang | H04N 21/84 |
| 2017/0347026 A1* | 11/2017 | Hannuksela | H04L 65/4084 |
| 2018/0061002 A1* | 3/2018 | Lee | H04N 19/88 |
| 2018/0063505 A1* | 3/2018 | Lee | H04N 19/597 |

OTHER PUBLICATIONS

Choi, B. et al.; Study of ISO/IEC DIS 23000-20 Omnidirectional Media Format; Coding of Moving Pictures and Audio; ISO/IEC JTC1/SC29/WG11 N16950; Torino, Italy; Jul. 2017.

Taiwan Intellectual Property Office, First Office Action for Taiwan Patent Application No. 106135473, dated Oct. 23, 2018.

* cited by examiner

```
aligned(8) class SampleRegionOfInterest
extends TransformProperty('sroi') {
unsigned int(16)reference_width;
unsigned int(16)reference_height;
unsigned int(16)top_left_x;
unsigned int(16)top_left_y;
unsigned int(16)width;
unsigned int(16)height;
unsigned int(1)interpolate;
unsigned int(7)reserved;
}
```

*Figure 8*

```
aligned(8) class SampleViewport
extends TransformProperty('svpt') {
    unsigned int(8) dimension;
    unsigned int(16) reference_x;
    if (dimension >= 2) {
        unsigned int(16) reference_y;
        unsigned int(16) reference_roll;
    }
    if (dimension >= 3) {
        unsigned int(16) reference_z;
        unsigned int(16) reference_pitch;
        unsigned int(16) reference_yaw;
    }
    unsigned int(16) reference_2d_width;
    unsigned int(16) reference_2d_height;
    unsigned int(16) x;
    if (dimension >= 2) {
        unsigned int(16) y;
        unsigned int(16) roll;
    }
    if (dimension == 3) {
        unsigned int(16) z;
        unsigned int(16) pitch;
        unsigned int(16) yaw;
    }
}
```

```
unsigned int(8) shape;
if (shape == 1 || shape == 2 || shape == 3) {
    unsigned int(16) top_left_x;
    unsigned int(16) top_left_y;
    if (shape == 1 || shape == 2) {
        unsigned int(16) width;
        unsigned int(16) height;
    }
    if (shape == 2) {
        unsigned int(8) rotation;
    }
    if (shape == 3) {
        unsigned int(16) size;
    }
}
else if (shape == 4) {
    unsigned int(16) center_x;
    unsigned int(16) center_y;
    unsigned int(16) radius;
}
unsigned int(1) interpolate;
unsigned int(7) reserved;
}
```

*Figure 9*

| | | |
|---|---|---|
| 1 | Rectangle: $\iota^{(R)} = (w, h)$<br>where w = width, and h = height of the rectangle | 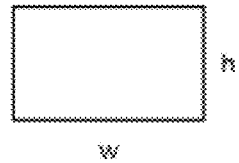 |
| 2 | Triangle: $\iota^{(T)} = (w, h, r)$<br>where w = width, h = height, and r = rotation (or orientation) of the triangle | r = 0:<br>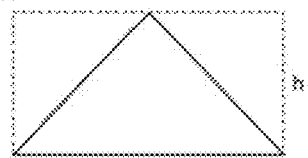<br>r = 1 (Upside Down):<br>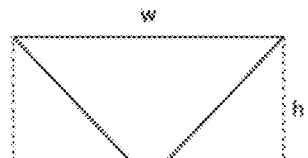<br>r = 2 (Upside Left):<br>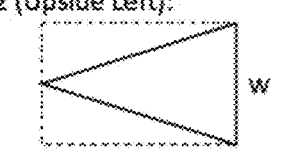<br>r = 3 (Upside Right):<br>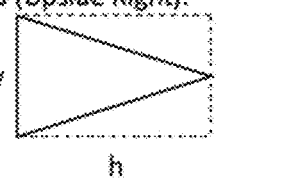 |
| 3 | Square: $\iota^{(S)} = d$<br>where d = size of the square | 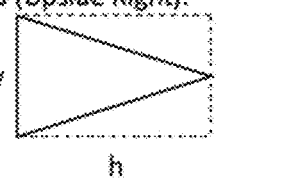 |
| 4 | Circle: $\iota^{(C)} = r$<br>where r = radius of the circle | 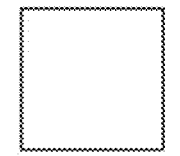 |
*Figure 10*

DERIVING AND SIGNALING A REGION OR VIEWPORT IN STREAMING MEDIA

CROSS REFERENCE TO RELATED PATENT APPLICATION(S)

The present disclosure is part of a non-provisional application that claims the priority benefit of U.S. Provisional Patent Application Nos. 62/408,867 and 62/410,414, filed on 17 Oct. 2016 and 20 Oct. 2016, respectively. Contents of above-listed applications are herein incorporated by reference.

TECHNICAL FIELD

The present disclosure relates generally to delivery of media content. In particular, the present disclosure relates to support for a region of interest (ROI) or a viewport for a 360-degree virtual reality (360VR) video presentation.

BACKGROUND

Unless otherwise indicated herein, approaches described in this section are not prior art to the claims listed below and are not admitted as prior art by inclusion in this section.

Video coding is used in a wide range of applications ranging from multimedia messaging, video telephony and video conferencing over mobile TV, wireless and Internet video streaming, standard- and high-definition TV broadcasting, as well as virtual reality (VR). Furthermore, video content is delivered to a variety of decoding devices with heterogeneous display and computational capabilities.

360-degree Virtual Reality (360VR) is an audiovisual simulation of an altered, augmented, or substituted environment. The visual reality video surrounds the user, allowing the user to look around in any direction or at any arbitrary view angle, just as he or she can in real life. 360VR videos produce exceptional high-quality and high-resolution panoramic videos for use in print and panoramic virtual tour production for a variety of applications, such as entertainment, pilot training, surgery, and exploration in space or deep water.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

A streaming encoder receives media content for a reference media presentation. The streaming encoder encodes the received media content as a plurality of component tracks. Each component track contains media or metadata samples for a component of the reference media presentation. The streaming encoder encodes a derived track that (i) references one or more of the plurality of component tracks and (ii) specifies a set of operations for constructing media and metadata samples of a sub-region of the reference media presentation based on the media or metadata samples from the referenced component tracks. The streaming encoder stores the encoded component tracks and the encoded derived track for retrieval (e.g., via streaming, downloading, etc.) as a streaming file.

A streaming decoder receives a streaming media file that includes the derived track for the reference media presentation. The streaming decoder selects a sub-region (e.g., a ROI) in the reference media presentation. The streaming decoder retrieves the derived track from the streaming media file. The streaming decoder receives the referenced component tracks referenced by the derived track. The streaming decoder then provides media samples for the selected sub-region by performing the set of operations specified by the derived track.

In some embodiments, the specified set of operations may include an instruction to construct a sub-region track according to metadata samples that are stored in one or more of the referenced component tracks. The instruction may include track references to one or more component tracks that store media samples and one or more component tracks that store metadata samples. The instruction may also include a constructor that invokes the track references to one or more component tracks that stores media samples and one or more component tracks that store metadata samples. The instruction may also include track references to one or more component tracks that store media samples and an indicator for indicating that metadata samples are stored in the derived track.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 8 illustrates example syntax of sample ROI transform property.

FIG. 9 illustrates example syntax for sample viewport transform property.

FIG. 10 illustrates a table for the possible values for the parameter shape.

DETAILED DESCRIPTION

Figure 1:
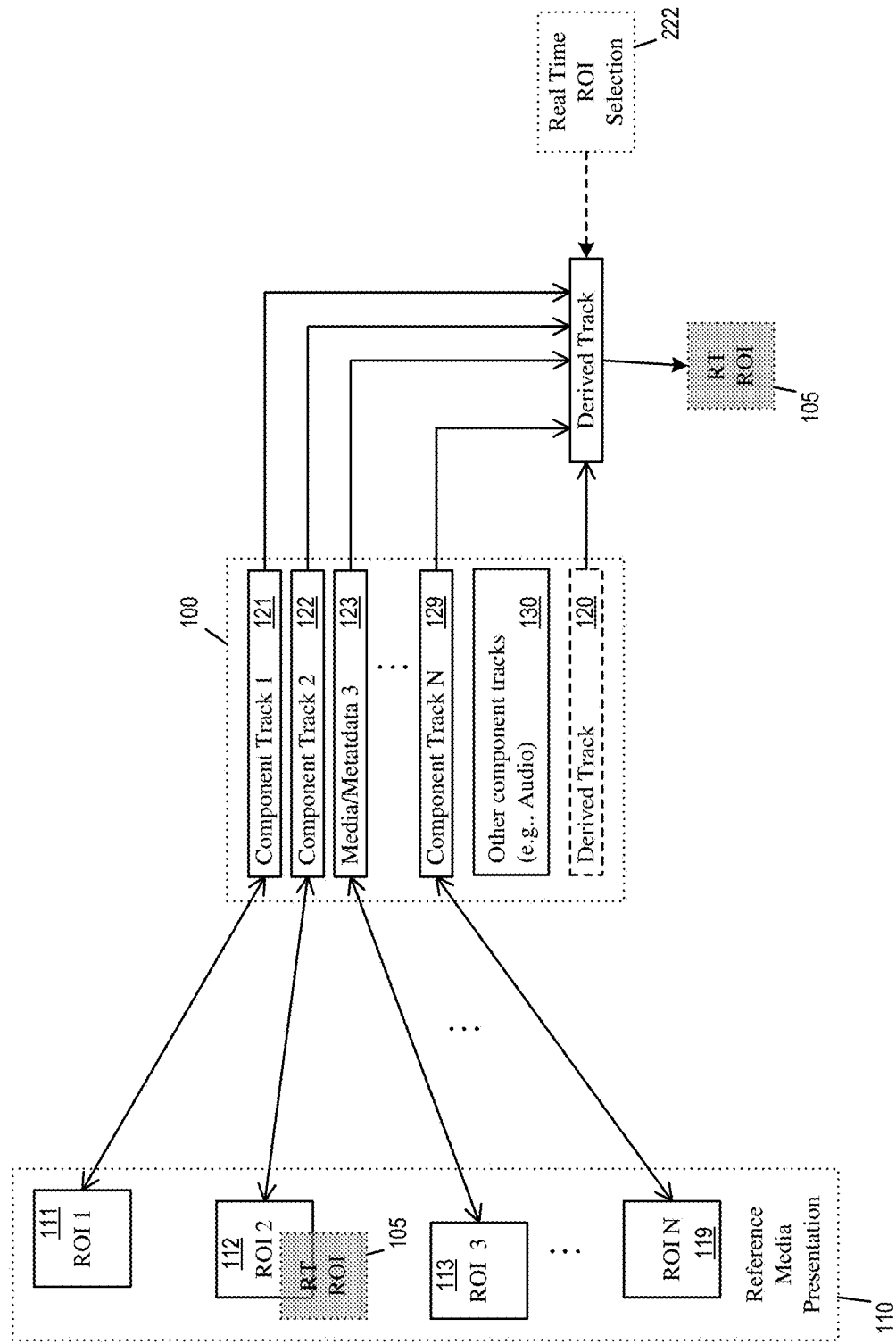
FIG. 1 conceptually illustrates the dynamic construction of an arbitrarily selected sub-region for a reference media presentation.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Dynamic ROI Construction Based on a Derived Track

For applications such as virtual reality (VR), free viewpoint television (FTV), region of interest (ROI), and video tile composition, some embodiments of the disclosure provides a method and/or system that supports dynamic construction of a user selected sub-region (e.g., viewport or ROI) from other sub-regions of a reference media presentation. At the streaming encoder and/or sender side of the system, different spatial objects (such as different sub-regions, views, angles, viewports, ROIs, etc.) may be encoded and transmitted as different component tracks in a streaming media file. At the decoder and/or receiver side of the system, a user may dynamically or arbitrarily select a sub-region in the reference media presentation, and the decoder constructs the content of the dynamically selected sub-region from the different component tracks in the streaming media file.

A reference media presentation is a video, audio and/or other types of media content (such as caption and timed text) presentation that may include several different components. These components may be visual or audio component that occupy different spatial and/or temporal positions of the reference media presentation. Examples of such components may include graphical overlays, video clips, audio clips, or defined sub-regions. A defined sub-region may correspond to a specified aspect, angle, view, region, viewport, or ROI of the larger reference media presentation. For example, the reference media presentation may be a 360-degree VR (360VR) presentation containing omnidirectional images in a platonic solid projection format (e.g., cube map projection, octahedron projection) or other types of projection format (e.g., equirectangular projection, equal area projection). In these instances, the different components may correspond to different faces or sub-regions of the omnidirectional images. The different components may also correspond to different ROIs or viewports (e.g., predefined by author of the reference media presentation) over the different portions of the 360VR presentation.

Each component has corresponding media samples and/or metadata that can be stored in corresponding component tracks of a streaming media file. Media samples of a component may include samples of compressed visual or audio values for that component. Metadata samples of a component define metadata of the component, including the spatial and temporal properties of the component, such as position, timing information, or transform properties or an ROI.

FIG. 1 conceptually illustrates the dynamic construction of an arbitrarily selected sub-region for a reference media presentation 110. The reference media presentation 110 is a 360VR presentation having several components 111-119. The figure illustrates the components 111-119 as being predefined ROIs or viewports over the 360VR presentation 110. In some embodiments, the components 111-119 may also be different views or faces of the omnidirectional images in the 360VR presentation.

The components 111-119 of the reference media presentation are encoded into several component tracks 121-130. The component tracks 121-129 contain samples of media content and/or definition metadata for the components (ROIs or views) 111-119. The component tracks 130 may include one or more tracks that corresponds to other components of the reference media presentation 110, such as audio tracks, timed text tracks, metadata tracks, or derived tracks. Though not illustrated, in some embodiments, the component tracks 121-129 include both media tracks and metadata tracks, where the media tracks are used to store or derive the samples of the media content of the ROIs, and the metadata tracks are used to store samples of definition metadata or timed metadata of the ROIs.

The figure also illustrates a derived track 120 that specifies instructions or information for deriving media content by referencing one or more of the component tracks 121-130. The derived content can be used to dynamically construct a real-time ROI or viewport 105. The dynamically constructed real-time (RT) ROI 105 may be a portion of the reference media presentation 110 arbitrarily chosen by the user (specified by sub-region selection 222). The position of the real-time ROI 105 in the reference media presentation may be arbitrarily determined when the reference media presentation 110 is displayed rather than statically determined when the reference media presentation 110 is encoded into the component tracks 121-130.

The instructions or information specified by the derived track 120 allows the content of the sub-region 105 to be constructed dynamically or on-demand from the content of the component tracks 121-130 rather than being hard-coded or pre-generated in a streaming media file. In the example illustrated in FIG. 1, the sub-region 105 is chosen by the user to overlap the predefined ROI 112. Correspondingly, the content of the sub-region 105 may be derived from the media samples and/or metadata stored in corresponding component tracks (e.g., the component track 122), based on instructions specified in derived track 120.

Though not illustrated, the component tracks of a reference media presentation may have multiple derived tracks. Furthermore, a derived track may reference other derived tracks in a recursive or nested manner. For some embodiments, the component tracks 121-130 may include one or more derived tracks (in addition to the derived track 120).

In some embodiments, a streaming encoder generates a streaming media file based on received media content for a reference media presentation. The streaming encoder encodes the received media content as a plurality of component tracks. Each component track has media samples. The streaming encoder encodes a derived track that (i) references one or more of the plurality of component tracks and (ii) specifies a set of operations for deriving media samples of a sub-region of the reference media presentation based on the media samples from the referenced component tracks. The streaming encoder stores or transmits the encoded component tracks and the encoded derived track as part of the streaming media file. In some embodiments, some of the encoded component tracks are referenced by the streaming media file but not transmitted to the decoder.

A streaming decoder receives the streaming media file (or retrieves the derived track and at least some of the plurality of component tracks through e.g., streaming, downloading or deriving). The streaming decoder selects a sub-region (e.g., a ROI) in the reference media presentation and provides media samples for the selected sub-region by performing the set of operations specified by the derived track.

Figure 2:
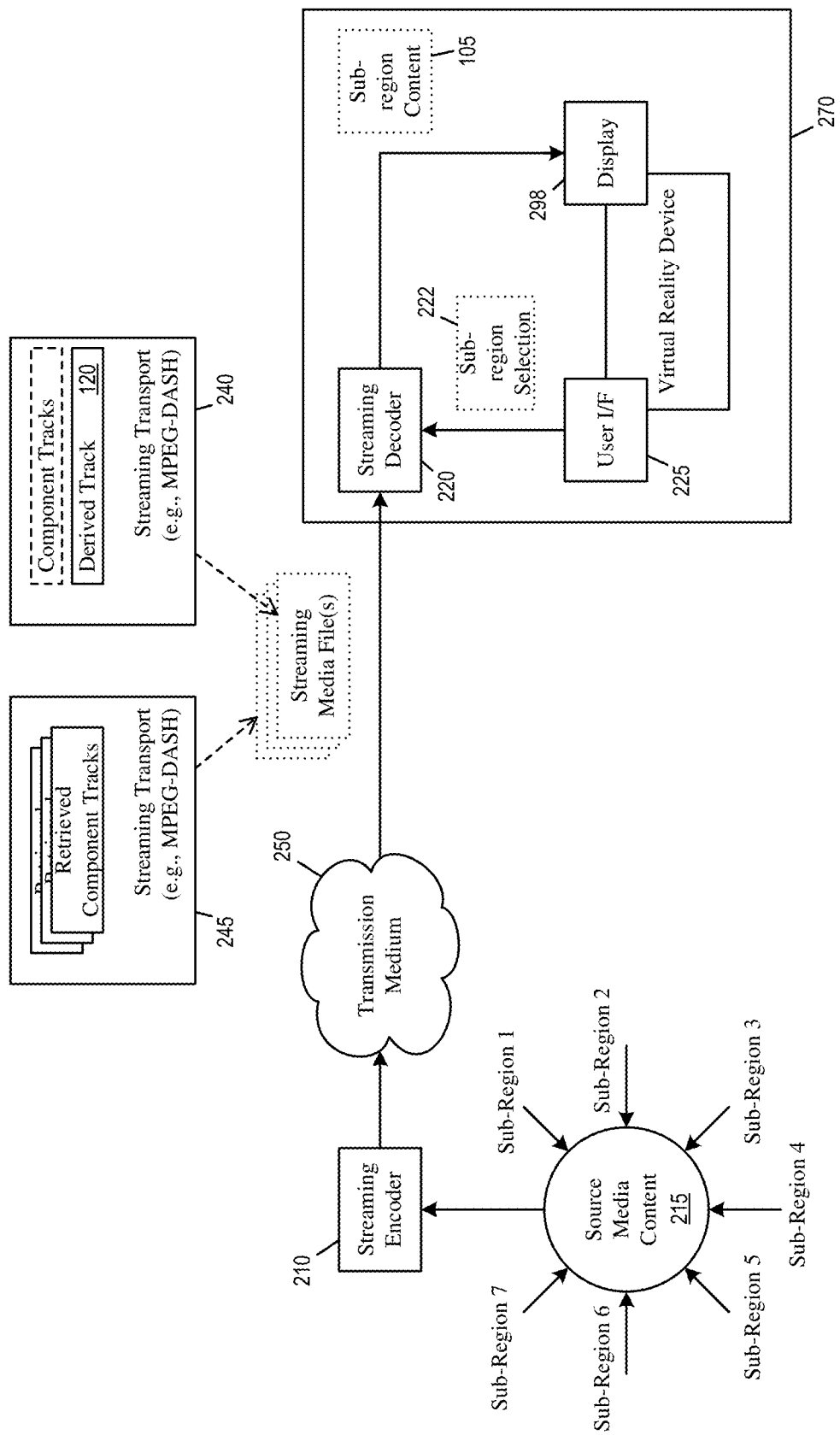
FIG. 2 illustrates the encoding, the transport, and the decoding of a generated media file that supports dynamic construction of an arbitrarily selected sub-region.

FIG. 2 illustrates the encoding, the transport, and the decoding of a generated media file that supports dynamic construction of a selected sub-region. As illustrated, a streaming encoder 210 receives media content of the reference media presentation 110 from a media content source 215 and generates the component tracks 121-129. The streaming encoder also generates a derived track 120, which may reference one or more of the component tracks 121-129. The streaming encoder 210 delivers the streaming media file 240 that includes the derived track 120 across the transmission medium 250 to a streaming decoder 220. The streaming decoder 220 receives the streaming media file 240, retrieves component tracks required by the derived track 120 in subsequent streaming media file(s) 245, and constructs the selected sub-region 105 from the retrieved component tracks according to operations specified in the derived track 120 for display.

The source media content 215 provides media content to be encoded by the streaming encoder 210 for the reference media presentation 110. The media content provided may be in form of pixel values, analog video signals, or other forms of data signals. The source media content 215 provides the content of the various components of the reference media presentation. For some embodiments in which the reference media presentation 110 is a 360VR presentation, different cameras positioned at different angles may capture different sub-regions of the omnidirectional images (e.g., faces, views, ROIs, viewports).

The streaming encoder 210 receives the content of the various components of the reference media presentation 110 from the source media content 215 to generate the component tracks 121-130 and the derived track 120. The derived track 120 and the component tracks 121-130 are selectively packaged into streaming media files (e.g., 240 or 245). In some embodiments, the steaming media files 240 and 245 are in ISO Base Media File Format (ISOBMFF, defined according to ISO/IEC 14496-12) and encapsulated in a streaming transport format such as Dynamic Adaptive Streaming over HTTP (DASH) to facilitate transport through the transmission medium 250.

The streaming media file 240 contains the derived track 120. The stream media file 240 may contain one or more of the component tracks 121-130. In some embodiments, the streaming media file 240 does not contain the actual component tracks 121-130 but instead contains only references for those tracks. The streaming decoder 220 upon receiving the streaming media file 240 may use the references contained therein to retrieve the necessary component tracks by e.g., requesting subsequent streaming media files 245 from the streaming encoder 210.

Figure 3:
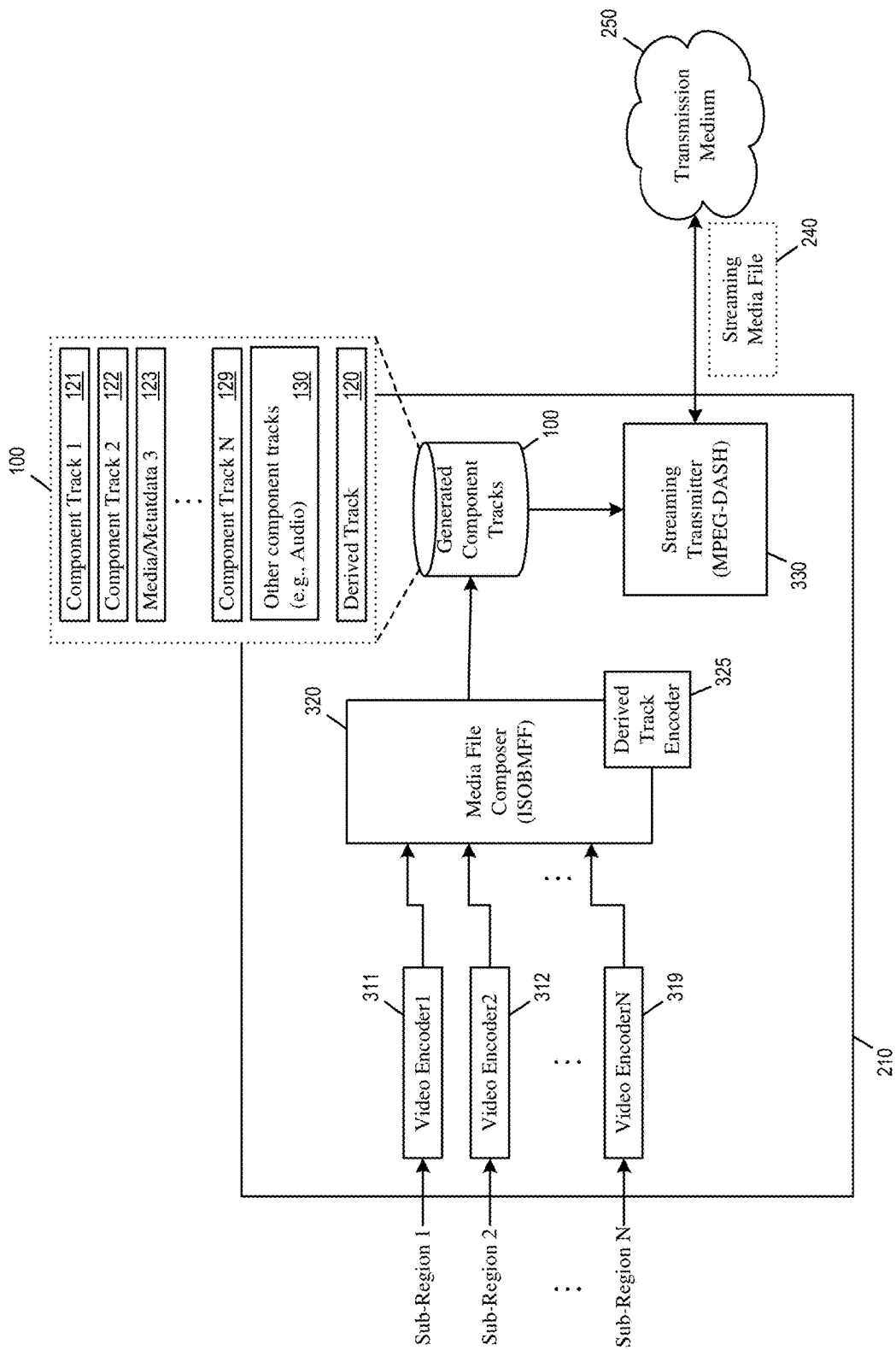
FIG. 3 illustrates an example implementation of the streaming encoder.

FIG. 3 illustrates an example implementation of the streaming encoder 210. As illustrated, the streaming encoder 210 includes several video encoders 311-319, a streaming media file composer 320, a derived track encoder 325, and a streaming transmitter 330. In some embodiments, the video encoders 311-319, the streaming media file composer 320, the derived track encoder 325, and the streaming transmitter 330 are modules of software instructions being executed by one or more processing units (e.g., a processor) of a computing device or electronic apparatus. In some embodiments, these modules are modules of hardware circuits implemented by one or more integrated circuits (ICs) of an electronic apparatus. Though the modules 311-319, 320, 325, and 330 are illustrated as being separate modules, some of the modules can be combined into a single module.

Each of the video encoders 311-319 receives a corresponding component content (e.g., predefined ROI, a view, a face, or other types of sub-region) of the reference media presentation 110 and performs encoding of their respective component content to produce the corresponding media samples and/or definition metadata. The video encoders 311-319 may be configured to perform encoding or compression under video coding standards such as H.264, H.265, VP9, etc. The video encoders 311-319 may also perform their corresponding encoding or compression operations according to different video coding standards. The video encoders 311-319 may perform their encoding or compression operations independently from each other. In some embodiments, the video encoders 311-319 may also provide the definition metadata based on authoring input.

The streaming media file composer 320 receives the encoded component content from the video encoders 311-319 (and other encoders) and generates the component tracks 120-130. The generated component tracks 120-130 are illustrated as being stored in a storage 100 for retrieval and delivery by streaming media files.

The encoded component content from each video encoder is stored into a corresponding component track as media samples and/or metadata samples for that track. In the example illustrated, the streaming media file composer 320 stores the encoded component content produced by video encoders 311-319 into component tracks 121-129, respectively. Though not illustrated, the streaming encoder 210 also includes one or more other types of media encoders for producing other component tracks 130. These other media encoders may include encoders for audio tracks, timed text tracks, and/or metadata tracks.

The streaming encoder 210 also generates a derived track 120. A derived track encoder 325 (which may be a component of the streaming media file composer 320) generates the derived track 120 by referencing at least some of the component tracks 121-129. In some embodiments, the derived track encoder 325 stores in the derived track 120 definition metadata samples. These definition metadata samples specify operations or instructions for deriving media samples of a sub-region of the reference media presentation based on the media and/or metadata samples from the referenced component tracks. The receiver of the derived track 120 (e.g., the streaming decoder 220) uses the specified operations to generate the media samples for the selected sub-region 105 by referencing the component tracks 121-129.

The streaming transmitter 330 selectively retrieves the generated component tracks and/or derived track from the storage 100 and package the retrieved tracks into streaming media files 240 or 245 according to a streaming transport format such as DASH. The streaming media file 240 may not include all component tracks of the reference media presentation but rather only the derived track 120 and/or a limited subset of the component tracks that are requested by the streaming decoder 220.

The streaming decoder 220 receives a sub-region selection 222 from a user interface 225, which indicates a selected sub-region 105 of the reference media presentation 110 by the user in real time. The streaming decoder 220 generates content for the selected sub-region 105 from the content of the received streaming media file 240. A display device 298 receives and displays the generated content for the selected sub-region. In some embodiments, the streaming decoder 220, the user interface 225, and the display device 298 are parts of an electronic apparatus 270. Such an electronic apparatus may be a VR viewing device (e.g., a VR goggle or a mobile device capable of VR display) that allows its user to dynamically select a sub-region (viewport) and displays content of that sub-region. In some embodiments, the streaming decoder 220, the user interface 225, and the display device 298 includes modules of hardware circuits implemented by one or more integrated circuits (ICs) of the electronic apparatus 270.

Figure 4:
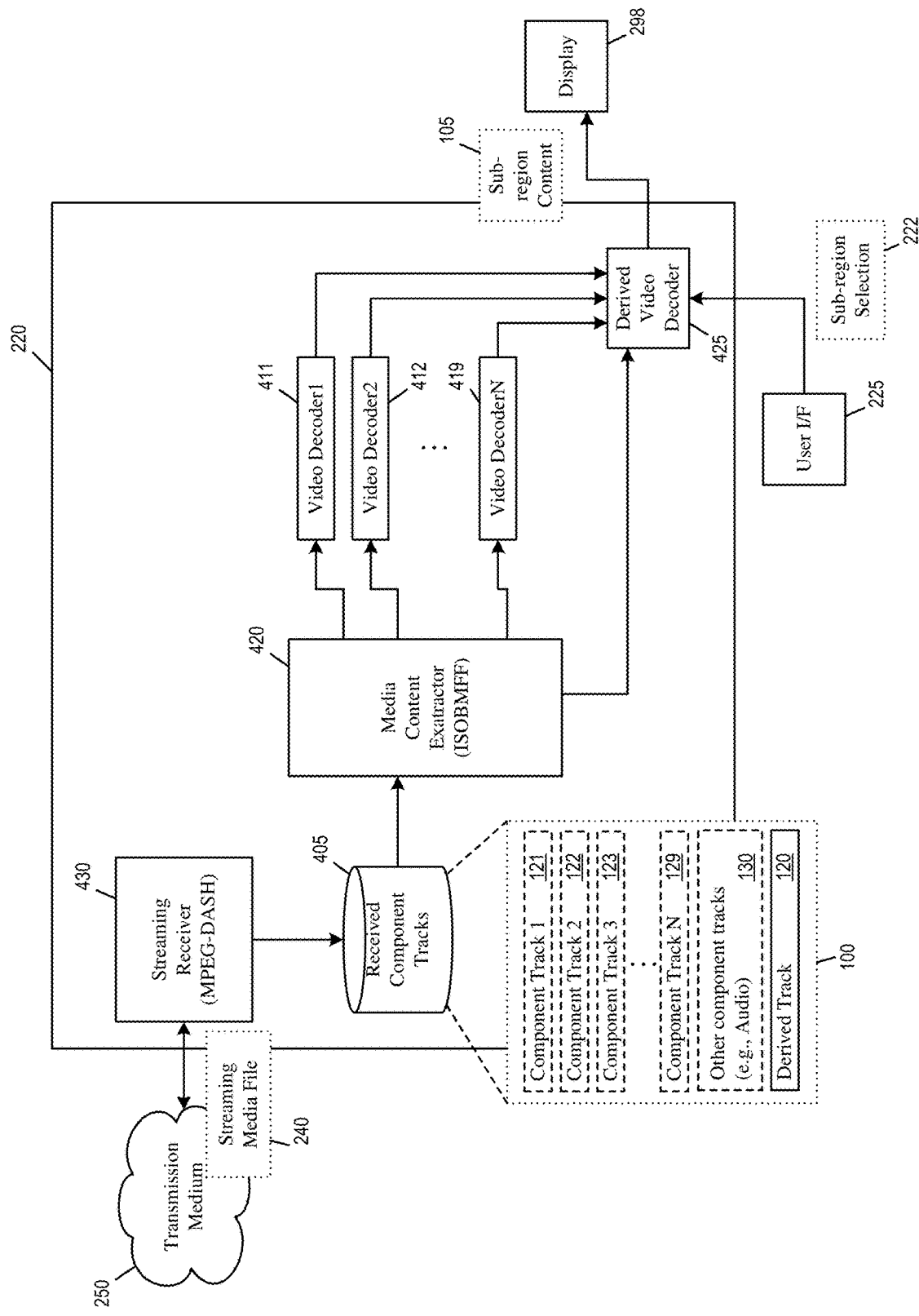
FIG. 4 illustrates an example implementation of the streaming decoder.

FIG. 4 illustrates an example implementation of the streaming decoder 220. As illustrated, the streaming decoder 220 includes several video decoders 411-419, a media content extractor 420, a derived track decoder 425, and a streaming receiver 430. In some embodiments, the video decoders 411-419, the media content extractor 420, the derived track decoder 425, and the streaming receiver 430 are modules of software instructions being executed by one or more processing units (e.g., a processor) of a computing device or electronic apparatus. In some embodiments, these modules are modules of hardware circuits implemented by one or more integrated circuits (ICs) of an electronic apparatus. Though the modules 411-419, 420, 425, and 430 are illustrated as being separate modules, some of the modules can be combined into a single module.

The streaming receiver 430 receives the streaming media file 240 from the transmission medium 250 by performing streaming protocol (DASH) and striping the streaming encapsulation. The media content extractor 420 then extracts the derived track 120 as well as any component tracks (e.g., 121-130) from the received streaming media file 240. The video decoders 411-419 receives and decodes the tracks 121-129, respectively, according to video coding standards such as H.264, H.265, or VP9. (The component tracks 130 are not decoded by the video decoders 411-419).

The derived video decoder 425 receives and decodes the derived track 120. The derived video decoder 425 also receives the decoded media samples and/or metadata samples from the video decoders 411-419. The derived video decoder 425 also receives the sub-region selection 222 from the user 225. Based on the received sub-region selection 222 and the content of the derived track 120, the derived video decoder 425 constructs the media content of the selected sub-region 105. Specifically, the derived video decoder 425 may perform the operations specified by the definition metadata samples stored in derived track 120 in order to generate the media samples for the selected sub-region 222. The generated media samples are then delivered as sub-region content 105 to the display device 298 to be displayed.

Since the dynamically constructed sub-region may only cover a small portion of the reference media presentation 110 (e.g., a subset of the predefined ROIs), the generation of the content of the selected sub-region may require only a subset of the component tracks. In other words, some of the component tracks whose content is not needed for deriving the sub-region content 105. In some embodiments, the streaming decoder 220 would identify which component tracks are needed for generating the selected sub-region and which tracks are not needed. The stream decoder 220 may retrieve and decode only the component tracks that are needed for generating the selected sub-region while omit retrieving and decoding component tracks that are not needed. The streaming decoder 220 may request only the needed component tracks from the streaming encoder 210 (or any other streaming source via the transmission medium 250) while bypassing component tracks that are not needed. The streaming encoder in turn delivers only the requested component tracks in the streaming media file 240 (or in subsequent streaming media files 245).

II. Signaling Mechanisms for Derived Tracks

Figure 5:
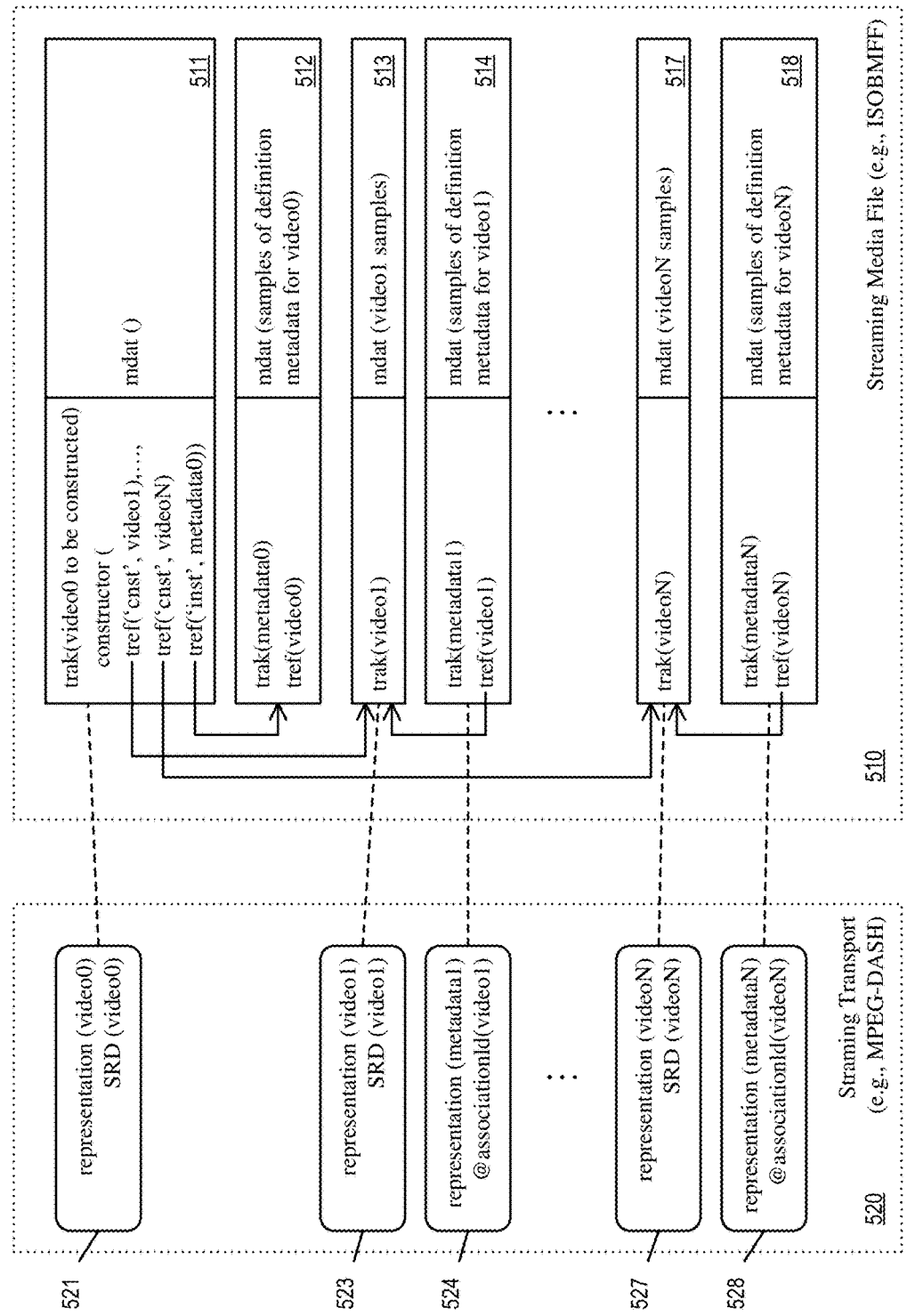
FIG. 5 illustrates a signaling mechanism based on a track constructor.
Figure 6:
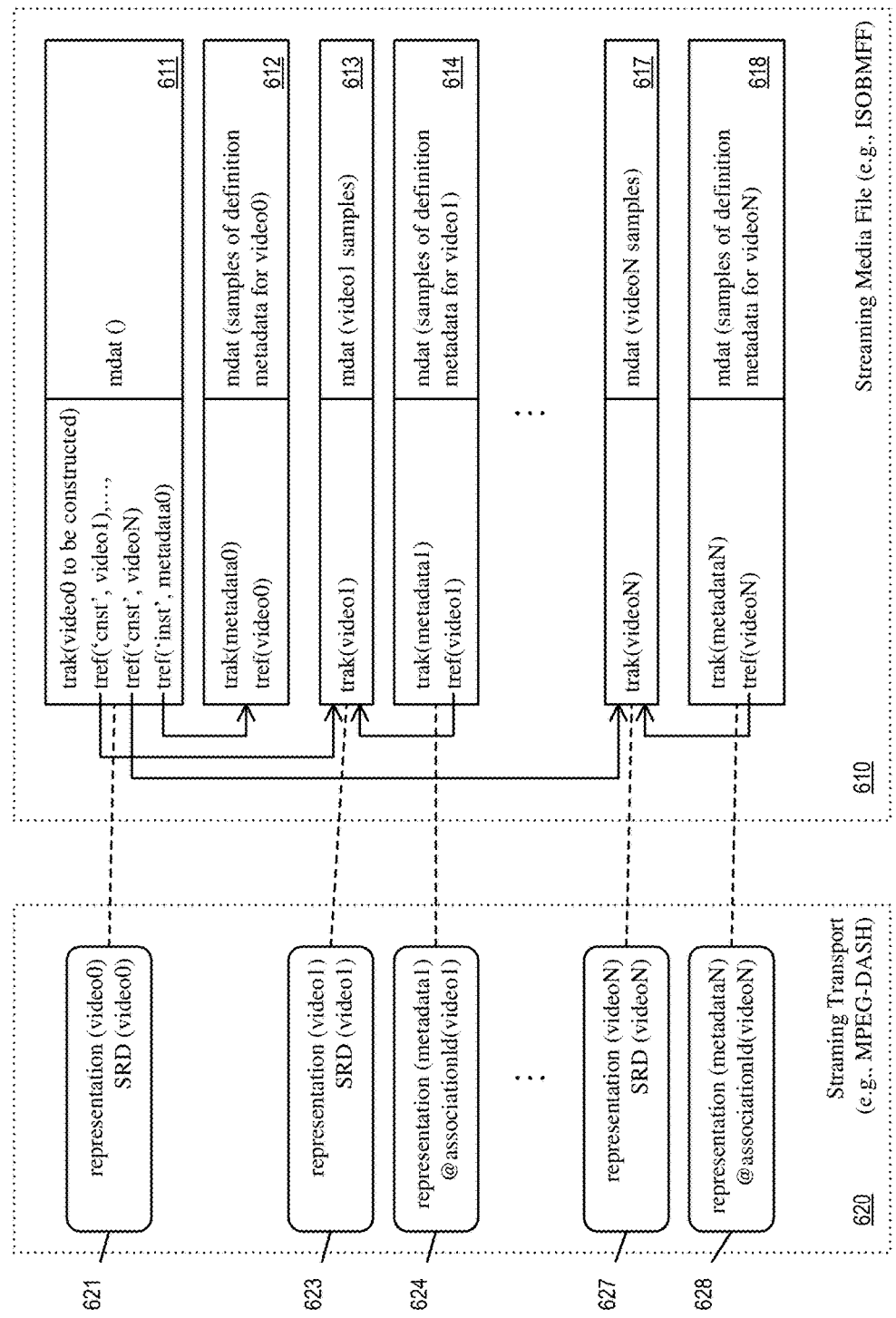
FIG. 6 illustrates a signaling mechanism based on viewport or ROI definition metadata.
Figure 7:
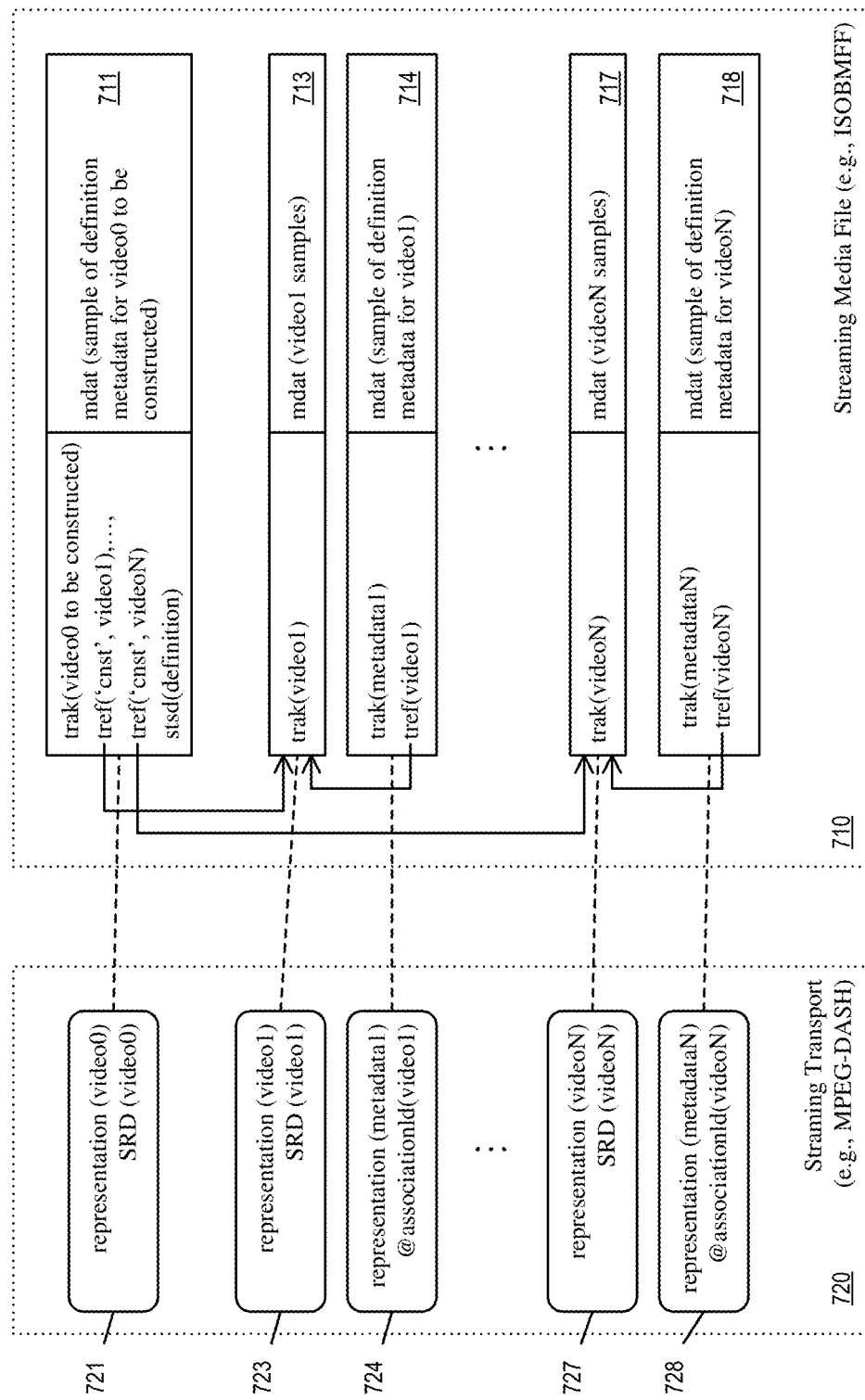
FIG. 7 illustrates a signaling mechanism based on viewport/ROI definition sample description.

FIG. 5-7 illustrates example signaling mechanisms for streaming transport and streaming media files that supports a derived track that references multiple other component tracks. As mentioned by reference to FIG. 1 above, the derived track allows the receiver to construct media content by referring to other component tracks of the reference media presentation 110. A derived track that is capable of referencing multiple other component tracks enables a corresponding sub-region (e.g., the arbitrarily chosen sub-region 105) to derive its content based on viewport and region definitions from those other component tracks.

In some embodiments, a derived track is similar in structure to any other media tracks in ISOBMFF. The signaling mechanisms for constructing viewport or ROI tracks from other viewport or ROI tracks rely on Coding Independent Code Points (CICP) definitions in ISO/IEC/23001-8 and their carriages in ISOBMFF as timed metadata and sample descriptions. The definitions of the viewports or ROIs are carried as either timed metadata in metadata tracks or sample description information in media tracks. The signaling mechanisms may use track reference types in ISOBMFF to identify component tracks that are referenced as media tracks for samples of media content and component tracks that are referenced as metadata tracks for samples of viewport/region definitions.

In some embodiments, the specified set of operations may include an instruction to construct a sub-region track according to metadata samples that are stored in the referenced component tracks. The instruction may include track references to one or more component tracks that store media samples and one or more component tracks that store metadata samples. The instruction may also include a constructor that invokes the track references to one or more component tracks that stores media samples and one or more component tracks that store metadata samples. The instruction may also include track references to one or more component tracks that store media samples and an indicator for indicating that metadata samples are stored in the derived track.

FIG. 5 illustrates a signaling mechanism based on a track constructor. A "constructor" is an in-stream structure that may be embedded in a derived track as an instruction to construct a viewport/ROI track by referencing one or more component tracks (which may be viewport/ROI tracks). The referenced component tracks are linked to the derived track in which the constructor resides, by using track references (indicated by e.g., 'tref' of ISOBMFF). A track reference may be of different types. For example, a track reference may be of type 'cnst', which indicates that the referenced track is a media track that contains media samples for viewport/ROI, or of a type 'inst', which indicates that the referenced track is a metadata track that contains viewport/

ROI definition metadata, or, more precisely, timed metadata for defining the viewport/ROI.

The figure illustrates a streaming media file 510 having several component tracks 511-518 in ISOBMFF. Among these, the track 511 is a derived track that invokes the 'constructor' structure. The constructor uses track references of type 'cnst' to reference track 513 and track 517 in order to use their samples as media samples (stored in tracks 513 and 517 using 'mdat'). The constructor also uses track reference of type 'inst' to reference the track 512 in order to use its samples (stored in track 512 using 'mdat') as definition metadata.

The figure also illustrates how a streaming encapsulation (e.g., DASH) is linked with the tracks of the streaming media file. As illustrated, a streaming encapsulation 520 uses spatial relationship descriptor (SRD) constructs to reference the tracks of the streaming media file 510. For example, SRD 521 is associated with the derived track 511, SRD 523 is associated with the component track 513, and SRD 524 is associated with the component track 514, etc.

FIG. 6 illustrates a signaling mechanism based on viewport or ROI definition metadata. The signaling mechanism uses the track references in a derived track as instructions to construct a viewport/ROI track by referencing one or more component tracks for viewports or ROIs.

The figure illustrates a streaming media file 610 having several component tracks 611-618 in ISOBMFF. Among these, the track 611 is a derived track. The derived track 611 uses 'tref' track references of type 'cnst' to reference track 613 and track 617 in order to use their samples as media samples (stored in tracks 613 and 617 using 'mdat'). The derived track 611 also uses track reference of type 'inst' to reference track 612 in order to use its samples (stored in track 612 using 'mdat') as definition metadata.

The figure also illustrates how a streaming encapsulation (e.g., DASH) is linked with the tracks of the streaming media file. As illustrated, a streaming encapsulation 620 uses spatial relationship descriptor (SRD) constructs to reference the tracks of the streaming media file 610. For example, SRD 621 is associated with the derived track 611, SRD 623 is associated with the component track 613, and SRD 624 is associated with the component track 614, etc.

FIG. 7 illustrates a signaling mechanism based on viewport/ROI definition sample description. Under this signaling mechanism, the derived track has track references for referencing other media tracks for their media samples, the derived track also has an indicator ('stsd') for indicating that the derived track itself stores definition sample description as definition metadata for a viewport/ROI. The media samples stored in the referenced media tracks and the definition sample description stored in the derived track itself are in turn used to construct a viewport/ROI track.

The figure illustrates a streaming media file 710 having several component tracks 711-718 in ISOBMFF. Among these, the track 711 is a derived track. The derived track 711 uses 'tref' track references of type 'cnst' to reference track 713 and track 717 in order to use their samples as media samples (stored in tracks 713 and 717 using 'mdat'). The derived track uses indicator 'stsd' to indicate that definition metadata for the ROI/viewport is stored in derived track 711 itself as definition sample description.

The figure also illustrates how a streaming encapsulation (e.g., DASH) is linked with the tracks of the streaming media file. As illustrated, a streaming encapsulation 720 uses spatial relationship descriptor (SRD) constructs to reference the tracks of the streaming media file 710. For example, SRD 721 is associated with the derived track 711, SRD 723 is associated with the component track 713, and SRD 724 is associated with the component track 714, etc.

III. Definition Metadata of an ROI or a Viewport

In some embodiments, the definition metadata for an ROI or a Viewport comprises samples of definition metadata (e.g., the metadata samples stored in tracks 512, 612, and 711). Each sample of metadata comprises an ordered list of operations to be performed on an ordered list of input image items or samples.

In some embodiments, each operation is a transform operation having a type 'TransformProperty' under ISOBMFF ISO/IEC 14496-12. Examples of such operations or transform properties include identity ('idtt', reproduction of an input image item), clean aperture ('clap', cropping transformation of an input image item), sample rotation ('srot', sample rotation of an input image item), and dissolve ('dslv', smooth blending of two or more input image items).

In order to support construction of ROI and/or viewport, some embodiments of the disclosure further provide the following operations or transform properties: sample ROI ('sroi') and sample viewport ('svpt'). These operations may have the same syntax as the timed ROI metadata sample entry defined in ISO/IEC 23001-10.

The sample ROI ('sroi') transform property (or operation) extracts an ROI from the input image item or a list of input image items according to an ROI definition. FIG. 8 illustrates example syntax of sample ROI transform property. The following are the explanations of the semantics in the example syntax for sample ROI transform property:

The parameters reference_width and reference_height give respectively the width and height of the reference rectangular space in which all ROI coordinates (top_left_x, top_left_y, width and height) are computed. These fields allow associating a ROI metadata track with video tracks of different resolutions but representing the same visual source.

The parameters top_left_x and top_left_y give respectively the horizontal and vertical coordinate of the top-left corner of the rectangle region associated with the media sample of the referenced track.

The parameters width and height give respectively the width and height of the rectangular region associated with the media sample of the referenced track.

The parameters interpolate indicates the continuity in time of the successive samples. When true, the application may linearly interpolate values of the ROI coordinates between the previous sample and the current sample. When false, there shall not be any interpolation of values between the previous and the current samples. When using interpolation, it is expected that the interpolated samples match the presentation time of the samples in the referenced track. For instance, for each video sample of a video track, one interpolated 2D Cartesian coordinate sample is calculated.

Sample Viewport

The sample viewport ('svpt') transform property constructs (or extracts) a viewport sample image from the input image item or a list of input image items according to a viewport definition. FIG. 9 illustrates example syntax for sample viewport transform property. The following are the explanations of the semantics in the example syntax for sample viewport transform property:

The parameter dimension indicates the dimension of the freedom space that the viewport is in. It takes a value of 1, 2 or 3.

The parameters reference_x, reference_y and reference_z give respectively the reference (or offset) values of the x-, y- and z-axis coordinates in the reference system in which values of the sway (x), heave (y) and surge (z) of all viewports are computed.

The parameters reference_pitch, reference_yaw and reference_roll give respectively the reference (or offset) values of the pitch, yaw and roll angles in the reference system in which the pitch, yaw and roll angles of all viewports are computed. The maximum ranges of reference_pitch, reference_yaw and reference_rol are, respectively, [0, 180], [0, 360] and [0, 360], representing the maximum angle ranges [−90, 90], [−180, 180], [−180, 180] for pitch, yaw and roll. The maximum value ranges can also be chosen to represent the maximum angle ranges [−90, 90], [0, 360], [0, 360] for pitch, yaw and roll.

The parameters reference_2d_width and reference_2d_height give respectively the width and height of the reference 2D planar rectangular space in which all viewport view coordinates (top_left_x, top_left_y, center_x, and center_y) are computed.

The parameters x, y and z give respectively the values of the x-, y- and z-axis coordinates in the reference system in which the sway (x), heave (y) and surge (z) of the viewport are computed. These fields allow associating a viewport metadata track with media tracks of different qualities but representing the same visual source.

The parameters pitch, yaw and roll give respectively the values of the pitch, yaw and roll angles in the reference system in which the pitch, yaw and roll angles of the viewport are computed. These fields allow associating a viewport metadata track with media samples of referenced media tracks of different qualities but representing the same visual source.

The parameter shape indicates a shape of the viewport view. FIG. 10 illustrates a table for the possible values for the parameter shape.

The parameters top_left_x and top_left_y give respectively the horizontal and vertical coordinates of the top-left corner of the rectangular (shape=1), triangular (shape=2) and squared (shape=3) viewport view associated with the media sample of the referenced track.

The parameters width and height give respectively the width and height of the rectangular (shape=1) and triangular (shape=2) viewport view associated with the media sample of the referenced track.

The parameter rotation gives the orientation of the triangular (shape=2) viewport view associated with the media sample of the referenced track. Its values, 0, 1, 2 and 3 represents upside up (no rotation), upside down (180° rotation), upside left (counter clockwise 90° rotation) and upside right (clockwise 90° rotation), respectively.

The parameter size gives the size of the square (shape=3) viewport view associated with the media sample of the referenced track.

The parameters center_x and center_y give respectively the horizontal and vertical coordinates of the center of the circular (shape=3) viewport view associated with the media sample of the referenced track.

The parameter radius gives the radius of the circular (shape=3) viewport view associated with the media sample of the referenced track.

The parameter interpolate indicates the continuity in time of the successive samples. When true, the application may linearly interpolate values of the corresponding viewport metadata attributes between the previous sample and the current sample. When false, there shall not be any interpolation of values between the previous and the current samples. When using interpolation, it is expected that the interpolated samples match the presentation time of the samples in the referenced track. For instance, for each video sample of a video track, one interpolated viewport definition sample is calculated.

It should be noted that the syntax illustrated in FIGS. 9-10 supports signaling viewports of various different dimensions and shapes. For some embodiments, the syntax may be simplified if the dimension and the shape of the viewports being signaled are known and fixed (e.g., "dimension=3" and "shape=1").

IV. Example Processes

Figure 11:
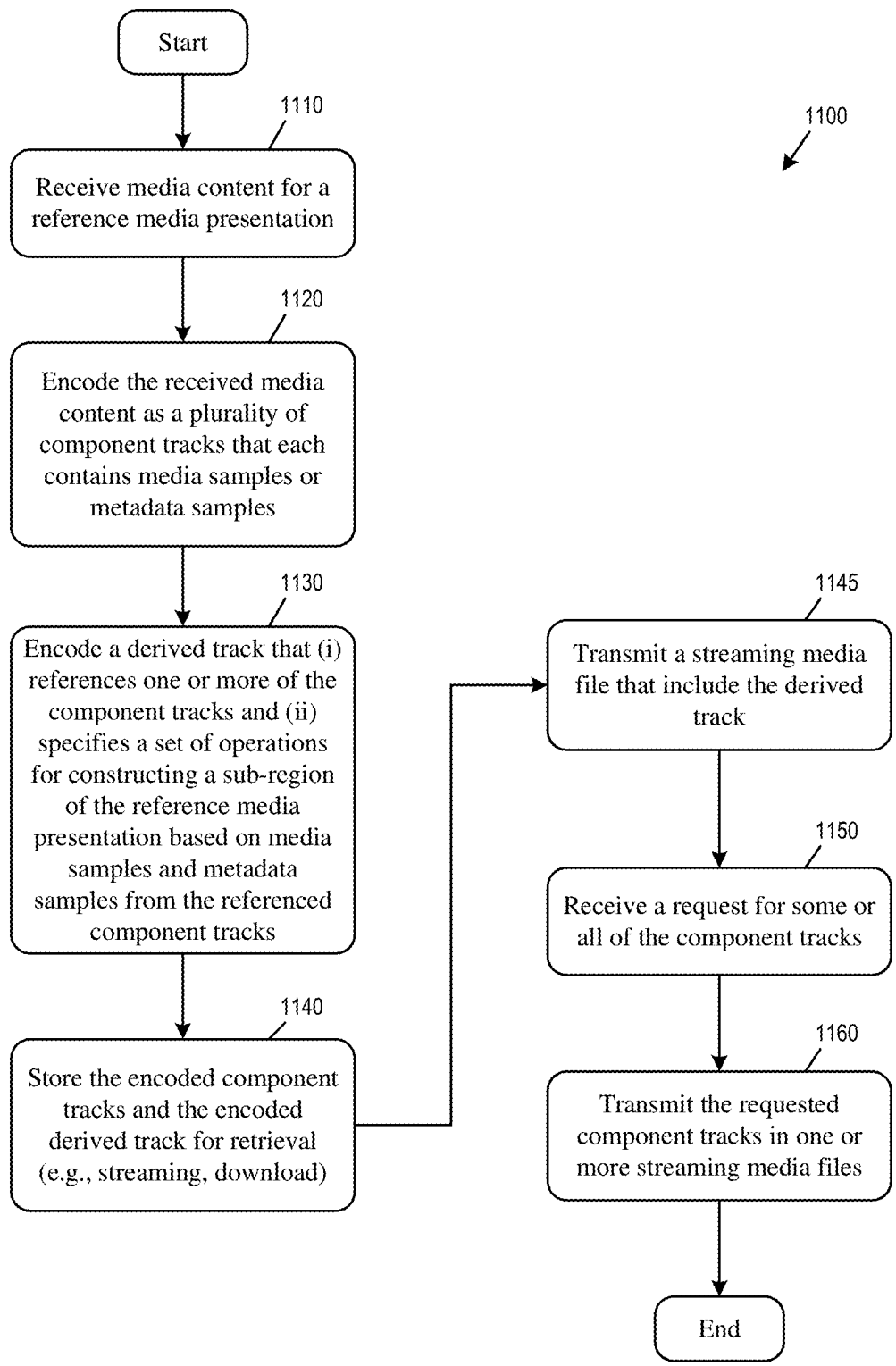
FIG. 11 conceptually illustrates a process that for generating component tracks and at least one derived track referencing at least some of the component tracks.

FIG. 11 conceptually illustrates a process 1100 that for generating component tracks and at least one derived track referencing at least some of the component tracks. In some embodiments, a streaming encoder (such as 210) performs the process 1100 when generating streaming media files (such as the streaming media files 240, 245, 510, 610, or 710 in ISOBMFF). In some embodiments, one or more processing units (e.g., a processor) of a computing device implementing the streaming encoder performs the process 1100 by executing instructions stored in a computer readable medium.

The process 1100 starts when the streaming encoder receives (at step 1110) media content for a reference media presentation. Such a reference media presentation may be a 360VR presentation. The reference media presentation may include multiple different components such as graphical overlays, video clips, audio clips, and/or defined sub-regions of the presentation such as viewports, ROIs, or faces of omnidirectional images.

The streaming encoder encodes (at step 1120) the received media content as a plurality of component tracks that each contains media samples or metadata samples. A component track may be a media track that contains media samples of a corresponding component of the reference media presentation (such as video samples of a viewport or ROI). A component track may also be a metadata track that contains metadata samples (definition metadata) that provide definitions and/or parameters for a corresponding component of the reference media presentation (such as geometric definitions or parameters of a viewport or ROI).

The streaming encoder also encodes (at step 1130) a derived track that (i) references one or more of the component tracks and (ii) specifies a set of operations for deriving media samples of a sub-region of the reference media presentation based on the media samples and metadata samples from the referenced component tracks. The signaling mechanism of the derived track is described by reference to FIGS. 5-7 above. The operations that may be specified by the referenced metadata sample are described by reference to FIGS. 8-10 above. The streaming encoder stores (at step 1140) the encoded component tracks and the encoded derived track for retrieval.

The streaming encoder transmits (at 1145) a streaming media file that includes the derived track. The streaming encoder may also receive (at step 1150) a request for some or all of the component tracks. A streaming decoder that receives the derived track may generate this request based on which track is needed to dynamically construct a sub-region (ROI or viewport) according to the derived track. The streaming encoder in turn transmits (at step 1160) the requested component tracks in one or more streaming media files. The transmitted streaming media file may be in ISOBMFF and DASH format. The process 1100 then ends.

Figure 12:
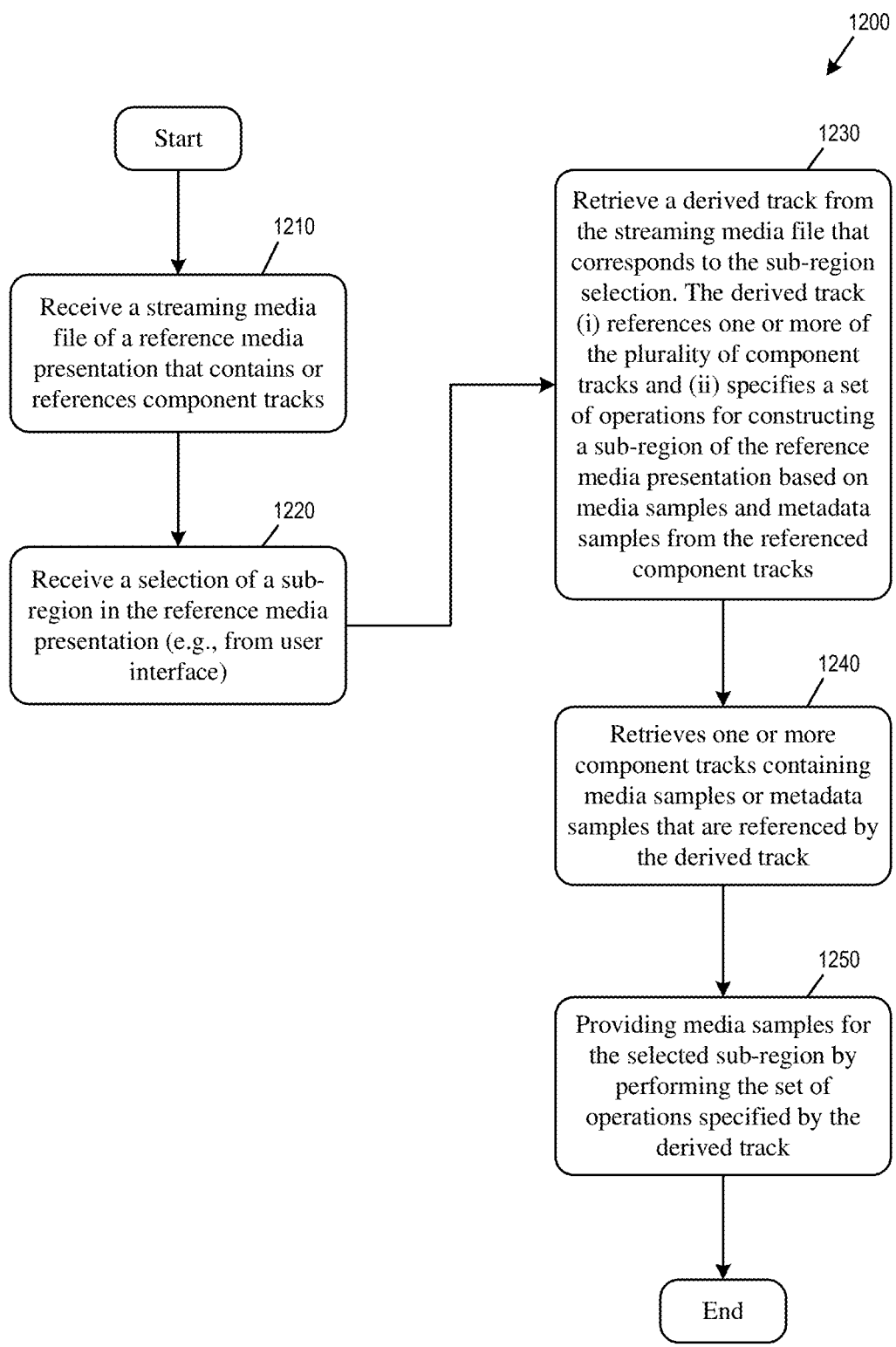
FIG. 12 conceptually illustrates a process for dynamically constructing a specified sub-region (e.g., ROI or viewport) based on a derived track in a streaming media file.

FIG. 12 conceptually illustrates a process 1200 for dynamically constructing a specified sub-region (e.g., ROI or viewport) based on a derived track in a streaming media file. In some embodiments, a streaming decoder (such as 220) performs the process 1200 after receiving a streaming media file (such as the streaming file 240). In some embodiments, one or more processing units (e.g., a processor) of a computing device implementing the streaming decoder performs the process 1200 by executing instructions stored in a computer readable medium.

The process 1200 starts when the streaming decoder receives (at step 1210) a streaming media file for a reference media presentation. The streaming media file may be a streaming ISOBMFF media file received via DASH protocol. The streaming media file may contain one or more component tracks and/or may reference one or more component tracks for the reference media presentation. The streaming media file may also contain a derived track that references one or more of the component tracks. A component track may be a media track that contains media samples of a corresponding component (e.g., a viewport or ROI) of the reference media presentation. A component track may also be a metadata track that contains metadata samples that provide definitions and/or parameters for a corresponding component of the reference media presentation.

The streaming decoder receives (at step 1220) a selection of a sub-region in the reference media presentation. The selection may be a real-time selection from the user of a 360VR device through a user interface (e.g., 225).

The streaming decoder retrieves (at step 1230) a derived track from the streaming media file that corresponds to the sub-region selection. The derived track (i) references one or more of the component tracks and (ii) specifies a set of operations for constructing a sub-region of the reference media presentation based on media samples and metadata samples from the referenced component tracks. The signaling mechanism of the derived track is described by reference to FIG. 5-7 above. The operations that may be specified by the referenced metadata samples are described by reference to FIGS. 8-10 above.

The streaming decoder then retrieves (at 1240) one or more component tracks that are referenced by the derived track. The retrieved component tracks contain media samples or metadata samples that are referenced and/or required for constructing the content of the derived track. The required component tracks may already be in the streaming file along with the derived track. The required component tracks may include some derived tracks to be derived. The streaming decoder may also retrieve the required component tracks by requesting a subsequent streaming media file (e.g., 245) that contains the required component tracks. The streaming decoder may also derive the required component tracks that are derived tracks first in a recursive manner.

The streaming decoder provides (at step 1250) media samples for the selected sub-region by performing the set of operations specified by the derived track, which uses and/or references media samples or metadata samples in the retrieved component tracks to construct the content of the selected sub-region. In some embodiments, the sub-region selection dynamically determines which operations specified by the derived track (via the referenced metadata samples) are performed. The process 1200 then ends.

V. Example Video Encoder

Figure 13:
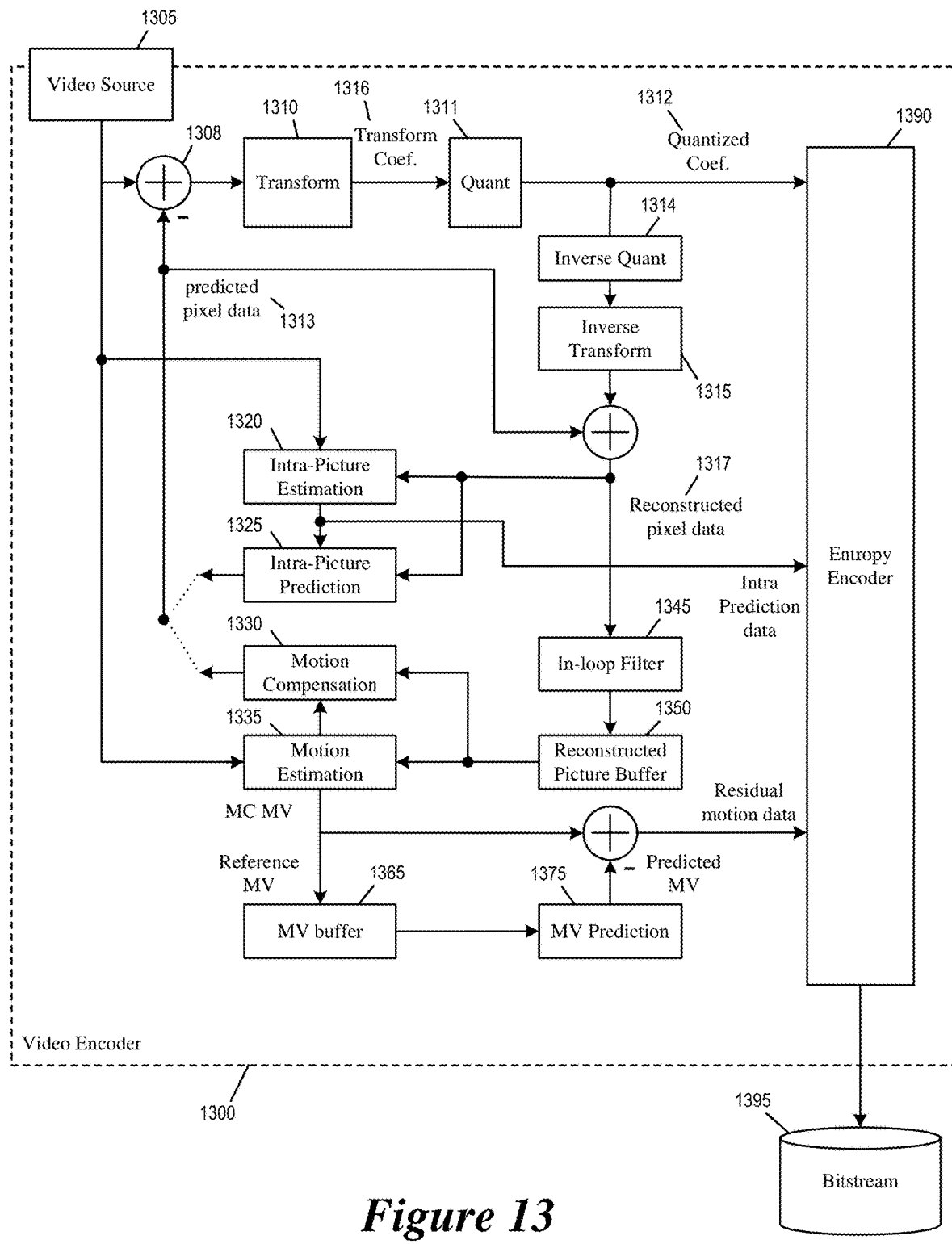
FIG. 13 illustrates an example video encoder.

FIG. 13 illustrates an example video encoder 1300 that implements at least some of the video encoders 311-319 in the streaming encoder 210.

As illustrated, the video encoder 1300 receives input video signal from a video source 1305 and encodes the signal into bitstream 1395. The video encoder 1300 has several components or modules for encoding the video signal 1305, including a transform module 1310, a quantization module 1311, an inverse quantization module 1314, an inverse transform module 1315, an intra-picture estimation module 1320, an intra-picture prediction module 1325, a motion compensation module 1330, a motion estimation module 1335, an in-loop filter 1345, a reconstructed picture buffer 1350, a MV buffer 1365, and a MV prediction module 1375, and an entropy encoder 1390.

In some embodiments, the modules 1310-1390 are modules of software instructions being executed by one or more processing units (e.g., a processor) of a computing device or electronic apparatus. In some embodiments, the modules 1310-1390 are modules of hardware circuits implemented by one or more integrated circuits (ICs) of an electronic apparatus. Though the modules 1310-1390 are illustrated as being separate modules, some of the modules can be combined into a single module.

The video source 1305 provides a raw video signal that presents pixel data of each video frame without compression. A subtractor 1308 computes the difference between the raw video pixel data of the video source 1305 and the predicted pixel data 1313 from motion compensation 1330 or intra-picture prediction 1325. The transform 1310 converts the difference (or the residual pixel data) into transform coefficients (e.g., by performing Discrete Cosine Transform, or DCT). The quantizer 1311 quantized the transform coefficients into quantized data (or quantized coefficients) 1312, which is encoded into the bitstream 1395 by the entropy encoder 1390.

The inverse quantization module 1314 de-quantizes the quantized data (or quantized coefficients) 1312 to obtain transform coefficients, and the inverse transform module 1315 performs inverse transform on the transform coefficients to produce reconstructed pixel data 1317 (after adding prediction pixel data 1313). In some embodiments, the reconstructed pixel data 1317 is temporarily stored in a line buffer (not illustrated) for intra-picture prediction and spatial MV prediction. The reconstructed pixels are filtered by the in-loop filter 1345 and stored in the reconstructed picture buffer 1350. In some embodiments, the reconstructed picture buffer 1350 is a storage external to the video encoder 1300. In some embodiments, the reconstructed picture buffer 1350 is a storage internal to the video encoder 1300.

The intra-picture estimation module 1320 performs intra-prediction based on the reconstructed pixel data 1317 to produce intra prediction data. The intra-prediction data is provided to the entropy encoder 1390 to be encoded into bitstream 1395. The intra-prediction data is also used by the intra-picture prediction module 1325 to produce the predicted pixel data 1313.

The motion estimation module 1335 performs inter-prediction by producing MVs to reference pixel data of previously decoded frames stored in the reconstructed picture buffer 1350. These MVs are provided to the motion compensation module 1330 to produce predicted pixel data. These MVs are also necessary for reconstructing video frame at the single-channel decoding system. Instead of encoding the complete actual MVs in the bitstream, the video encoder 1300 uses temporal MV prediction to generate predicted MVs, and the difference between the MVs used for motion compensation and the predicted MVs is encoded as residual motion data and stored in the bitstream 1395 for the single-channel decoding system.

The video encoder 1300 generates the predicted MVs based on reference MVs that were generated for encoding previously video frames, i.e., the motion compensation MVs that were used to perform motion compensation. The video encoder 1300 retrieves reference MVs from previous video frames from the MV buffer 1365. The video encoder 1300 stores the MVs generated for the current video frame in the MV buffer 1365 as reference MVs for generating predicted MVs.

The MV prediction module 1375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1395 by the entropy encoder 1390.

The entropy encoder 1390 encodes various parameters and data into the bitstream 1395 by using entropy-coding techniques such as context-adaptive binary arithmetic coding (CABAC) or Huffman encoding. The entropy encoder 1390 encodes parameters such as quantized transform data and residual motion data into the bitstream.

The in-loop filter 1345 performs filtering or smoothing operations on the reconstructed pixel data 1317 to reduce the artifacts of coding, particularly at boundaries of pixel blocks. In some embodiments, the filtering operation performed includes sample adaptive offset (SAO). In some embodiment, the filtering operations include adaptive loop filter (ALF).

VI. Example Video Decoder

Figure 14:
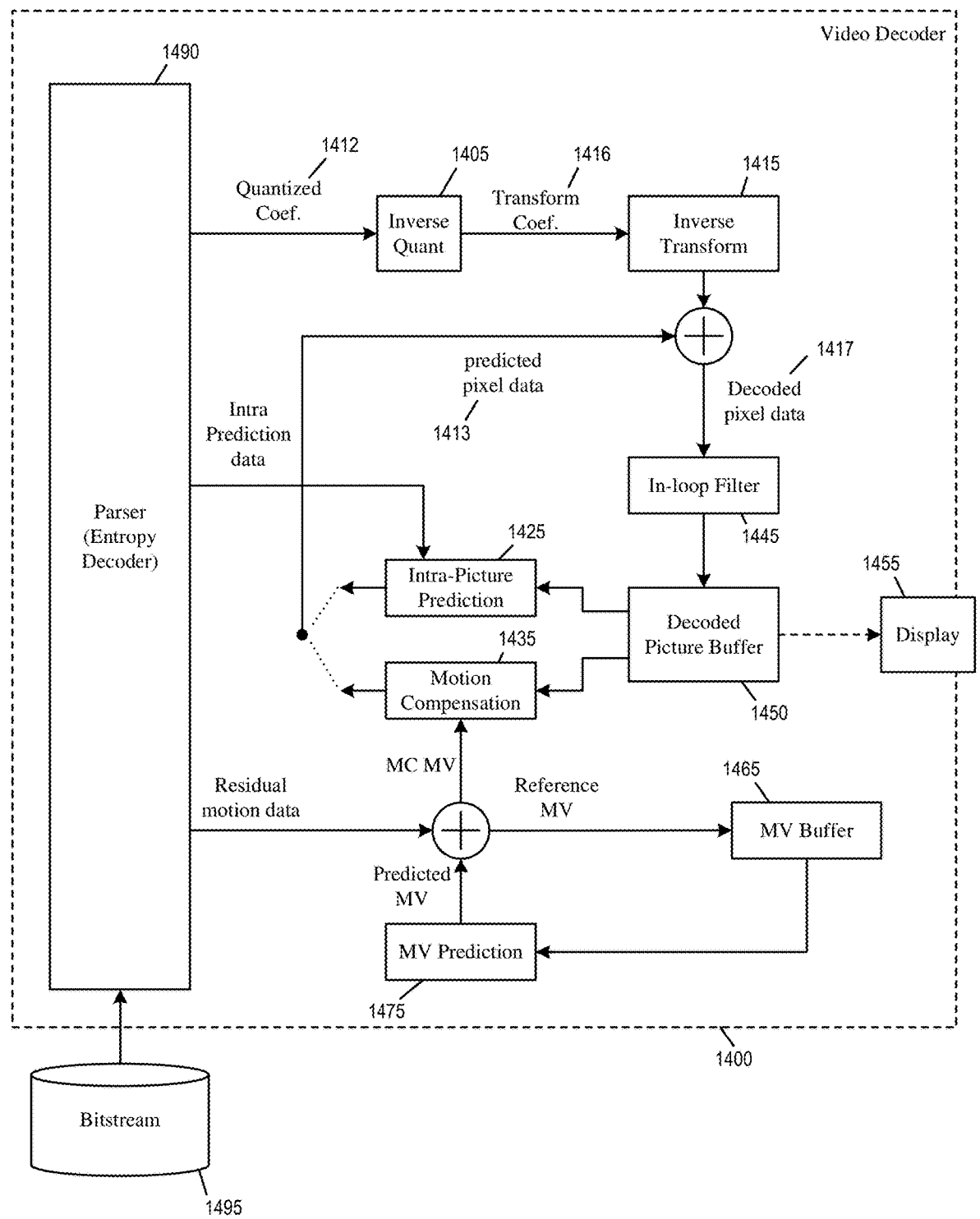
FIG. 14 illustrates an example video decoder.

FIG. 14 illustrates an example video decoder 1400 that implements at least some of the video decoders 411-419 in the streaming decoder 220.

As illustrated, the video decoder 1400 is an image-decoding or video-decoding circuit that receives a bitstream 1495 and decodes the content of the bitstream into pixel data of video frames for display. The video decoder 1400 has several components or modules for decoding the bitstream 1495, including an inverse quantization module 1405, an inverse transform module 1415, an intra-picture prediction module 1425, a motion compensation module 1435, an in-loop filter 1445, a decoded picture buffer 1450, a MV buffer 1465, a MV prediction module 1475, and a bitstream parser 1490.

In some embodiments, the modules 1410-1490 are modules of software instructions being executed by one or more processing units (e.g., a processor) of a computing device. In some embodiments, the modules 1410-1490 are modules of hardware circuits implemented by one or more ICs of an electronic apparatus. Though the modules 1410-1490 are illustrated as being separate modules, some of the modules can be combined into a single module.

The parser 1490 (or entropy decoder) receives the bitstream 1495 and performs initial parsing according to the syntax defined by a video-coding or image-coding standard. The parsed syntax element includes various header elements, flags, as well as quantized data (or quantized coefficients) 1412. The parser 1490 parses out the various syntax elements by using entropy-coding techniques such as context-adaptive binary arithmetic coding (CABAC) or Huffman encoding.

The inverse quantization module 1405 de-quantizes the quantized data (or quantized coefficients) 1412 to obtain transform coefficients, and the inverse transform module 1415 performs inverse transform on the transform coefficients 1416 to produce decoded pixel data 1417 (after adding prediction pixel data 1413 from the intra-prediction module 1425 or the motion compensation module 1435). The decoded pixels data are filtered by the in-loop filter 1445 and stored in the decoded picture buffer 1450. In some embodiments, the decoded picture buffer 1450 is a storage external to the video decoder 1400. In some embodiments, the decoded picture buffer 1450 is a storage internal to the video decoder 1400.

The intra-picture prediction module 1425 receives intra-prediction data from bitstream 1495 and according to which, produces the predicted pixel data 1413 from the decoded pixel data 1417 stored in the decoded picture buffer 1450. In some embodiments, the decoded pixel data 1417 is also stored in a line buffer (not illustrated) for intra-picture prediction and spatial MV prediction.

In some embodiments, the content of the decoded picture buffer 1450 is used for display. A display device 1455 either retrieves the content of the decoded picture buffer 1450 for display directly, or retrieves the content of the decoded picture buffer to a display buffer. In some embodiments, the display device receives pixel values from the decoded picture buffer 1450 through a pixel transport.

The motion compensation module 1435 produces predicted pixel data 1413 from the decoded pixel data 1417 stored in the decoded picture buffer 1450 according to motion compensation MVs (MC MVs). These motion compensation MVs are decoded by adding the residual motion data received from the bitstream 1495 with predicted MVs received from the MV prediction module 1475.

The video decoder 1400 generates the predicted MVs based on reference MVs that were generated for decoding previous video frames, e.g., the motion compensation MVs that were used to perform motion compensation. The video decoder 1400 retrieves the reference MVs of previous video frames from the MV buffer 1465. The video decoder 1400 also stores the motion compensation MVs generated for decoding the current video frame in the MV buffer 1465 as reference MVs for producing predicted MVs.

The in-loop filter 1445 performs filtering or smoothing operations on the decoded pixel data 1417 to reduce the artifacts of coding, particularly at boundaries of pixel blocks. In some embodiments, the filtering operation performed includes sample adaptive offset (SAO). In some embodiment, the filtering operations include adaptive loop filter (ALF).

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 15:
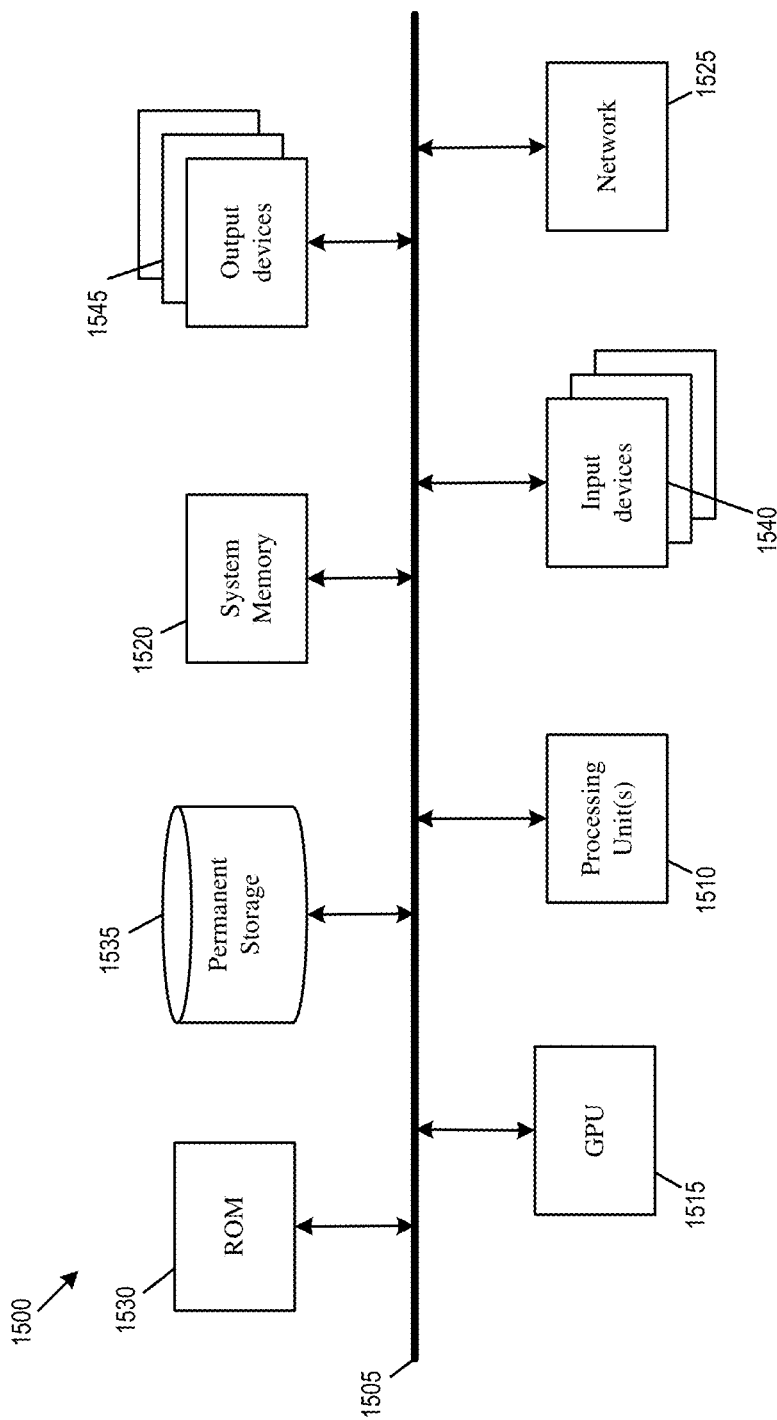
FIG. 15 conceptually illustrates an electronic system with which some embodiments of the present disclosure are implemented.

FIG. 15 conceptually illustrates an electronic system 1500 with which some embodiments of the present disclosure are implemented. The electronic system 1500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1500 includes a bus 1505, processing unit(s) 1510, a graphics-processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the GPU 1515, the read-only memory 1530, the system memory 1520, and the permanent storage device 1535.

From these various memory units, the processing unit(s) 1510 retrieves instructions to execute and data to process in order to execute the processes of the present disclosure. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the present disclosure use a mass-storage device (such as a magnetic or optical disk and its corresponding disk drive) as the permanent storage device 1535.

Other embodiments use a removable storage device (such as a floppy disk, flash memory device, etc., and its corresponding disk drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, processes in accordance with the present disclosure are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alpha-numeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 11 and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implemented over a transmission medium, the method comprising:
    receiving media content for a reference media presentation;
    encoding the received media content as a plurality of component tracks, each component track comprising video media or metadata samples for a component of the reference media presentation;
    encoding a derived track that (i) references at least two of the plurality of component tracks and (ii) specifies a set of operations for constructing video media and metadata samples of no more than a sub-region of the reference media presentation based on the video media or metadata samples from the at least two referenced component tracks, wherein:
        the sub-region corresponds to a viewport or a region of interest (ROI), and each of the at least two referenced component tracks is a sub-region track that provides media samples for an associated portion of the sub-region;
        video media content of the derived track is constructed by referencing the at least two referenced component tracks and performing the set of operations; and the derived track comprises no video media content before performing the set of operations; and providing a streaming media file for the media presentation, having the encoded derived track, for retrieval, wherein the providing comprises transmitting the streaming media file over the transmission medium to a receiver, for:

decoding the encoded derived track for the reference media presentation; and upon receipt of a selection of the sub-region of the reference media presentation from a user through a user interface associated with the receiver:

constructing, at the receiver, the video media content of the derived track by referencing the at least two referenced component tracks;

dynamically constructing, at the receiver, the viewport or ROI of the video media content for the selected sub-region of the reference media presentation, by performing the set of operations specified in the derived track, for display to the user.

2. The method of claim 1, further comprising:

receiving a request over the transmission medium from the receiver for a subset of the plurality of component tracks; and transmitting over the transmission medium to the receiver only the requested component tracks.

3. The method of claim 1, wherein the set of operations comprise an instruction to construct video media samples of a sub-region track for the derived track according to metadata samples of one or more of the at least two referenced component tracks.

4. The method of claim 3, wherein the instruction comprises track references to at least two component tracks that stores video media samples and one or more component tracks that store metadata samples.

5. The method of claim 3, wherein the instruction comprises a constructor that invokes the track references to at least two component tracks that stores video media samples and one or more component tracks that store metadata samples.

6. The method of claim 3, wherein the instruction comprises track references to at least two component tracks that stores video media samples and an indicator for indicating that metadata samples are stored in the derived track.

7. The method of claim 1, wherein the set of operations specified by the derived track comprises an ordered list of operations to be performed on an ordered list of input images or samples from the plurality of component tracks for the reference media presentation.

8. The method of claim 7, wherein one or more of the referenced component tracks are metadata tracks storing metadata samples, wherein each metadata sample of a referenced metadata track specifies a dimension of a sub-region and a position of the sub-region in the reference media presentation for performing the ordered list of operations.

9. The method of claim 8, wherein the sub-region corresponds to a viewport and the reference media presentation is a 360-degree virtual reality (360VR) video presentation, and wherein each metadata sample further specifies a set of angles of the viewport relative to the reference media presentation for performing the ordered list of operations.

10. The method of claim 8, wherein each metadata sample further specifies a shape of the sub-region.

11. A method implemented over a transmission medium, the method comprising:

receiving from a sender over the transmission medium a streaming media file for a reference media presentation that comprises a plurality of components, each of the components having a corresponding component track, each component track comprising video media or metadata samples;

receiving a selection from a user through a user interface, the user selecting a sub-region in the reference media presentation; and retrieving a derived track from the received streaming media file that corresponds to the sub-region selection, wherein the derived track (i) references at least two of the plurality of component tracks and (ii) specifies a set of operations for constructing video media samples of no more than the sub-region based on the video media samples of the at least two referenced component tracks, wherein:

the selected sub-region corresponds to a viewport or a region of interest (ROI), and each of the at least two referenced component tracks is a sub-region track that provides media samples for an associated portion of the selected sub-region;

video media content of the derived track is constructed by referencing the at least two referenced component tracks and performing the set of operations; and the derived track comprises no video media content before performing the set of operations;

wherein the viewport or ROI of the video media content for the selected sub-region of the reference media presentation is dynamically constructed, for display to the user.

12. The method of claim 11, wherein providing the video media samples for the selected sub-region comprises selecting a subset of the at least two referenced component tracks based on the specification of the sub-region and performing the set of operations based on the video media samples that are in the selected subset of component tracks but not on the video media samples that are not in the selected subset of component tracks.

13. The method of claim 11, wherein the set of operations comprise an instruction to construct video media samples of a sub-region track for the derived track according to metadata samples of one or more of the referenced component tracks.

14. The method of claim 13, wherein the instruction comprises track references to at least two of component tracks that stores video media samples and one or more component tracks that store metadata samples.

15. The method of claim 13, wherein the instruction comprises a constructor that invokes the track references to at least two component tracks that stores video media samples and one or more component tracks that store metadata samples.

16. The method of claim 13, wherein the instruction comprises track references to at least two component tracks that stores video media samples and an indicator for indicating that metadata samples are stored in the derived track.

17. The method of claim 11, wherein the set of operations specified by the derived track comprises an ordered list of operations to be performed on an ordered list of input images or samples from the plurality of component tracks for the reference media presentation.

18. The method of claim 17, wherein one or more of the referenced component tracks are metadata tracks storing metadata samples, wherein each metadata sample of a referenced metadata track specifies a dimension of a sub-region and a position of the sub-region in the reference media presentation for performing the ordered list of operations.

19. The method of claim 18, wherein the sub-region corresponds to a viewport and the reference media presentation is a 360-degree virtual reality (360VR) video presentation, wherein each metadata sample further specifies a set of angles of the viewport relative to the reference media presentation for performing the ordered list of operations.

20. The method of claim 18, wherein each metadata sample further specifies a shape of the sub-region.

21. An electronic apparatus comprising:
  a user interface circuit capable of receiving a selection from a user of a sub-region in a reference media presentation; and
  a streaming decoder circuit capable of:
  receiving from a sender over a transmission medium a streaming media file for the reference media presentation that comprises a plurality of components, each of the components having a corresponding component track, each component track comprising video media or metadata samples; and
  retrieving a derived track from the received streaming media file that corresponds to the sub-region selection, the derived track (i) referencing at least two of the plurality of component tracks and (ii) specifying a set of operations for constructing video media sample of no more than the sub-region based on the video media samples of the at least two referenced component tracks, wherein:
    the selected sub-region corresponds to a viewport or a region of interest (ROI), and each of the at least two referenced component tracks is a sub-region track that provides media samples for an associated portion of the selected sub-region;
    video media content of the derived track is constructed by referencing the at least two referenced component tracks and performing the set of operations; and
    the derived track comprises no video media content before performing the set of operations;
    wherein the viewport or ROI of the video media content for the selected sub-region of the reference media presentation is dynamically constructed, for display to the user.

\* \* \* \* \*